United States Patent [19]

Osato et al.

[11] Patent Number: 6,021,280

[45] Date of Patent: Feb. 1, 2000

[54] DISPLAY SYSTEM FOR CAMERA

[75] Inventors: Noriyuki Osato; Yoshiyuki Iwamatsu, both of Narashino, Japan

[73] Assignee: Seiko Precision Inc., Japan

[21] Appl. No.: 09/107,216

[22] Filed: Jun. 30, 1998

[30] Foreign Application Priority Data

Jan. 7, 1997 [JP] Japan .................................. 9-175465

[51] Int. Cl.[7] .................................................. G03B 1/00
[52] U.S. Cl. ........................... 396/287; 396/291; 396/292
[58] Field of Search .................................... 396/281, 287, 396/288, 289, 290, 291, 292, 296

[56] References Cited

U.S. PATENT DOCUMENTS

| | | | |
|---|---|---|---|
| 4,688,922 | 8/1987 | Furuya et al. ............................ | 396/290 |
| 4,751,546 | 6/1988 | Yamamoto et al. ..................... | 396/292 |
| 5,298,936 | 3/1994 | Akitake et al. ........................... | 396/287 |
| 5,359,422 | 10/1994 | Fukushima ............................... | 396/287 |
| 5,434,642 | 7/1995 | Sasagaki .................................. | 396/287 |
| 5,659,817 | 8/1997 | Fujino et al. ............................. | 396/291 |
| 5,696,998 | 12/1997 | Yamada et al. .......................... | 396/292 |

*Primary Examiner*—Russell Adams
*Attorney, Agent, or Firm*—Adams & Wilks

[57] ABSTRACT

A camera display system comprises circuit sections and a driving section disposed in a camera, a display section having display patterns each corresponding to an error detected in one of the circuit sections or the driving section, and a control section for controlling the display section and the circuit sections. When an error is detected in one of the circuit sections or the driving section of the camera, the control section controls the display section to display the detected error by turning ON or OFF the display pattern corresponding to the detected error while flickering the remaining display patterns.

8 Claims, 4 Drawing Sheets

DISPLAY SYSTEM FOR CAMERA

BACKGROUND OF THE INVENTION

1. Field of the Invention

The present invention relates to camera display systems and, more particularly, to a camera display system for detecting a camera error and informing an operator of the error by displaying the error.

2. Description of the Prior Art

Cameras are generally made up of various mechanisms and circuits, such as a power source circuit, a shutter, a light measuring unit, a distance measuring unit, a strobe flash, and a zoom lens barrel. If an error occurs in any of these mechanisms, it becomes impossible to perform a satisfactory photographing operation. Accordingly, if a certain error occurs anywhere in a camera, it must be informed right away to an operator. To cope with this, it is a usual practice to adopt, as a most convenient means, a method for displaying errors on a liquid crystal display panel where a film frame number or a photographing mode is displayed. In such a case, an error is indicated by displaying a character or a row of characters. For example, "E", where a display pattern representative of a numeral is two digits or less, or "Err", where the display pattern is three digits or more, as shown in FIG. 4, is displayed. Further, there is another structure that causes all of the display patterns to flicker for informing an error. On a copier or the like, on the other hand, error codes such as "E0"–"E9" are flickered to inform an error.

However, with the display of only one character such as "E", the operator might fail to recognize an error by misunderstanding it as one of many mode representations of the camera. Likewise, if "Err" is displayed, an operator, if not aware of the meaning of error, may also misunderstand it as a mode display. Meanwhile, the provision of rarely-utilized display patterns exclusively for displaying errors results in an increase in design limitation.

Conventionally, for example, the residual capacity of a battery in a camera is displayed by a character or symbol disposed in the liquid crystal display panel. However, the mere display of an error carried out by adding a character or symbol for representing the same to such a panel will likely be overlooked by the operator. On the other hand, if all of the display patterns are flickered, the operator can readily become aware of the existence of an error but it will be difficult for the operator to determine the origin of the error. Nevertheless, when an error code is flickered, such as in a copier, the operator can recognize the error because of the flickering.

In a camera, most detected errors cannot be recognized by an operator, particularly the origin and content of the errors. Even if the origin and content of the errors are recognized by the operator, such errors are usually too difficult to be corrected by the operator as compared to, for example, an error in a copier, e.g., by removal of a jammed paper. Therefore, it becomes necessary for the operator to take the camera to a camera repair shop for correction of the detected error. Once in the repair shop, the exact origin and nature of the error must be readily identified in order to enable correction of the error.

SUMMARY OF THE INVENTION

It is an object of the present invention to provide a camera display system which can detect a camera error and by which an operator can readily recognize the camera error while a camera repair shop can easily identify the origin and nature of the error.

Another object of the present invention is to provide a camera display system which permits an operator to recognize a camera error without confusing it with mode representations of the camera.

The foregoing and other objects of the present invention are carried out by a camera display system comprising a plurality of circuit sections and a driving section disposed in a camera, a display section having a plurality of display patterns each corresponding to an error detected in one of the circuit sections or the driving section, and a control section for controlling the display section and the circuit sections. According to the present invention, when an error is detected in one of the circuit sections or the driving section of the camera, the control section controls the display section to display the detected error by turning ON or OFF the display pattern corresponding to the detected error and to cause the remaining display patterns to flicker. By this construction, an operator can readily recognize an error in any of the circuit sections or the driving section of the camera. Furthermore, a camera repair shop can readily identify the origin and nature of the error by confirming which display pattern in the display section of the camera remained in an ON or OFF state and then making appropriate reference to a camera-shop instruction manual to correct the error.

In another embodiment, when an error is detected in the circuit sections or the driving section of the camera, the control section controls the display section to display the error when the operator performs a preselected operation. By this construction, an error can be displayed to the operator when required. Accordingly, there is no necessity to display the error for an unnecessarily long time, thereby reducing battery consumption.

In another embodiment, upon detection and display of a temporary camera error, the control section suspends the display of the error and returns each of the circuit sections and the driving section of the camera to an initial state when an operator performs a preselected operation (e.g., a clear-off operation). Thereafter, an operable state of the camera may be established after the error has been corrected. By this construction, operation of the camera is possible even when an inoperable state of the camera is encountered due to a temporary error.

BRIEF DESCRIPTION OF THE DRAWINGS

The foregoing summary, as well as the following detailed description of the preferred embodiments of the invention, will be better understood when read in conjunction with the accompanying drawings.

DETAILED DESCRIPTION OF THE PREFERRED EMBODIMENTS

Figure 1:
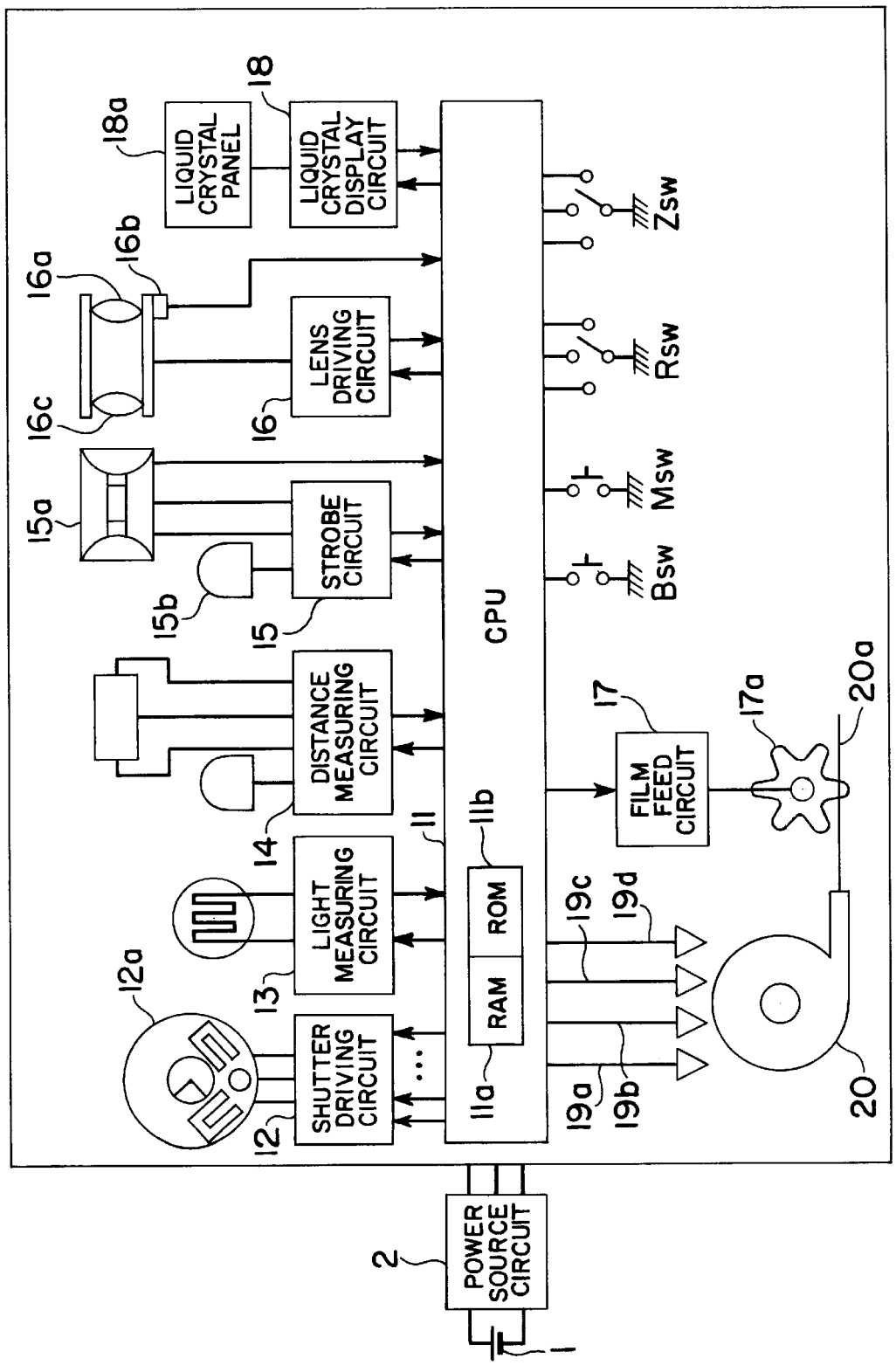
FIG. 1 is a block diagram of a display system for a camera according to an embodiment of the present invention.

Referring to FIG. 1, there is illustrated an overall structure of a camera display system according to the present invention, wherein the camera display system includes a battery 1. A power source circuit 2 raises a power voltage of the battery 1 to be supplied as a power source to each of the circuit sections hereinafter stated. A CPU 11 incorporates therein a RAM 11a as a readable and writable volatile memory used for computation or temporary storage, and a ROM 11b as a readable non-volatile memory. The RAM 11a is assigned by an exclusive memory site in order to temporarily store various data, such as camera modes. The ROM 11b stores various data used for a program or light and distance measuring operations.

A shutter driving circuit 12 drives a shutter 12a in response to a control signal supplied from the CPU 11 to perform light exposure operations. A light measuring circuit 13 measures a brightness of a subject and a distance measuring circuit 14 measures a distance to the subject, and their measuring results are respectively outputted to the CPU 11. A strobe circuit 15 drives both a strobe flash 15a to project auxiliary light onto the subject and a red-eye warning lamp 15b to reduce the red-eye phenomenon due to auxiliary light. A lens driving circuit 16 drives a zoom lens 16a and a focus lens 16c. The zoom lens 16a has a positional signal outputted through a zoom encoder 16b to the CPU 11. The setting of the focus lens 16c is made by the CPU 11 depending upon an output result of the distance measuring circuit 14. A film feed circuit 17 rotationally drives a sprocket 17a to thereby feed a film 20a from a film cartridge 20. A liquid crystal display circuit 18 drives a liquid crystal panel 18a to display photographing information of the camera. The detailed contents of the display on the liquid crystal panel 18a will be described later. Film sensitivity detecting terminals 19a–19d serve to detect a print pattern printed on the film cartridge 20 to enable the CPU 11 to calculate a sensitivity of the film 20a on the basis of the detection.

A main switch Bsw turns power for the camera ON and OFF while a release switch Rsw allows an operator to input a release signal. A mode switch Msw is used to cyclically set one of various photographing modes for the camera. A zoom switch Zsw is used to set a zoom ratio of a zoom lens 16a.

Figure 2:
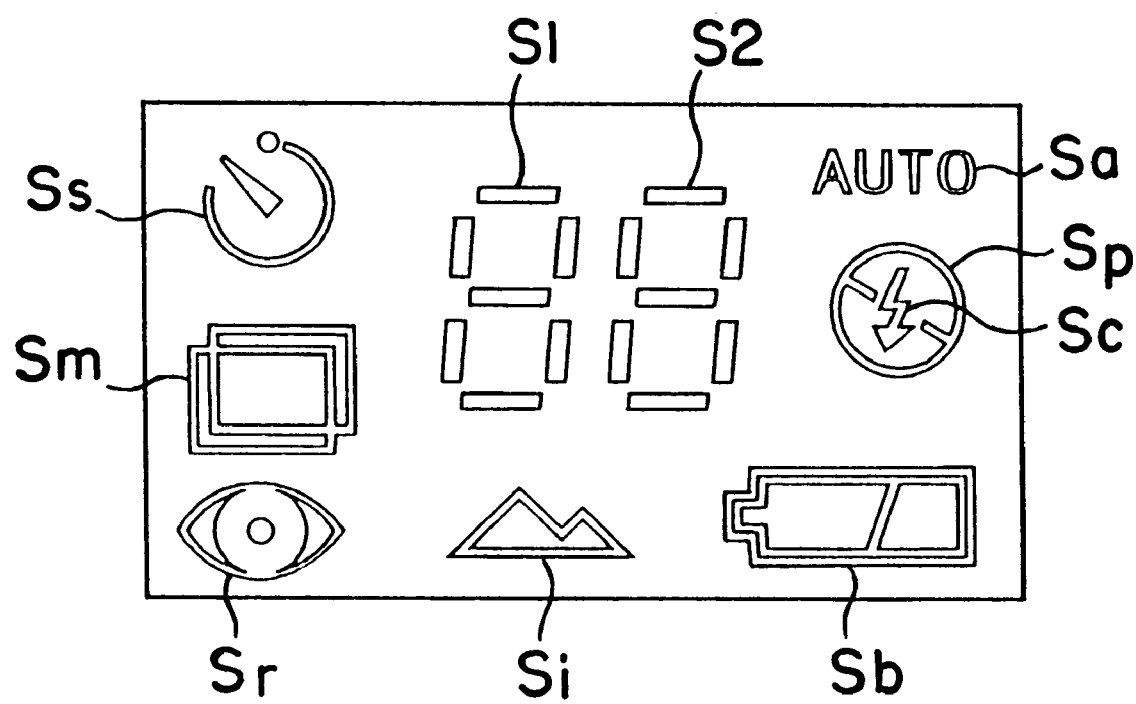
FIG. 2 is an illustrative view of a liquid crystal display panel configuration in the embodiment of FIG. 1.

Referring to FIG. 2, there is illustrated a front view of the liquid crystal display panel according to the present invention. Large display patterns S1 and S2, each in the form of a square-shaped "8", are disposed at a center of the liquid crystal display panel and, in this embodiment, represent a film residual amount. Display patterns Sc, Sp and Sa are disposed to the right of the display patters S1 and S2 and represent the modes of strobe flash forcible light projection, light project prohibition and auto light projection, respectively. To the left of the display patterns S1 and S2, there are a display pattern Ss that is lit during self-timer photographing and a display pattern Sm that is lit when a multi-exposure photographing operation is performed. At the lower side of the display panel are disposed a display pattern Sr that is lit when the red-eye warning lamp 15b is used, a display pattern Si that is lit when focusing is forcibly made at an infinite point, and a display pattern Sb that represents a residual capacity of the battery 1.

Figure 3A:
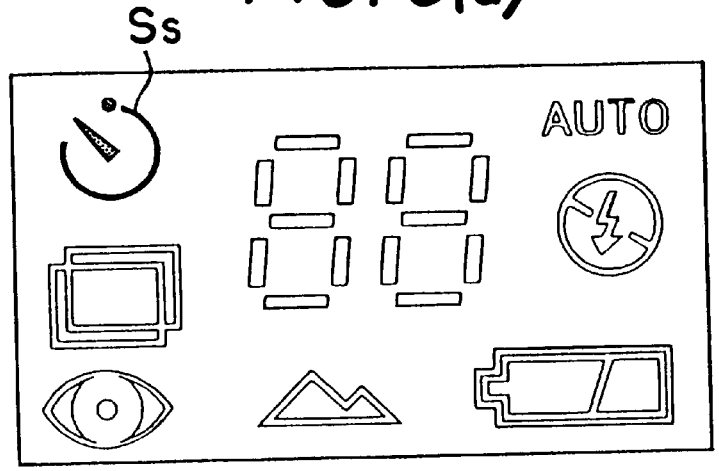
FIGS. 3(a)–3(b) are illustrative views showing error display patterns on the liquid crystal display panel of FIG. 2.

An illustration will now be given for a case when zooming becomes impossible to perform despite operation of the zoom switch Zsw due to, for example, an error in the zoom lens driving circuit 16 or the zoom lens 16a. When there is no change in an output of the zoom encoder 16b in a predetermined time period, the CPU 11 determines that there is a zoom function error and outputs a command to the liquid crystal display circuit 18 to light or turn ON only the display pattern Ss while the remaining display patterns are flickered as shown in FIG. 3(a). Here, it is assumed that a display pattern shown in black represents an ON state while a display pattern shown in double-edged lines represents a state of flickering. Camera errors can be readily recognized by the operator by flickering of the display patterns even if the operator cannot identify the origin or source of the error. In this illustration, when the flickering display patterns turn OFF, the display pattern Ss only remains turned ON. Accordingly, when the camera is brought to a camera shop, a shop clerk can readily identify an error in the zoom lens 16a by making reference to a camera instruction manual.

Figure 3B:
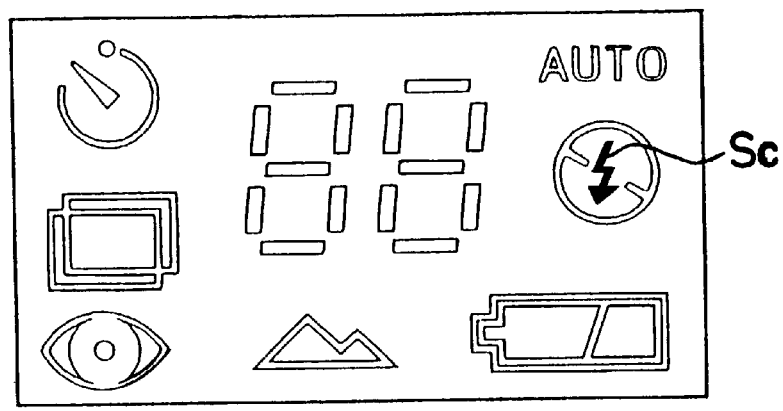

Similarly, when an error occurs in the strobe circuit 15 or the strobe flash 15a and the operation of the strobe flash 15a cannot be completed by lapse of a predetermined time period or a discharge cannot be detected, the CPU 11 outputs a command to the liquid crystal display circuit 18 to cause the display pattern Sc to turn ON with the other display patterns flickered as shown in FIG. 3(b).

Figure 3C:
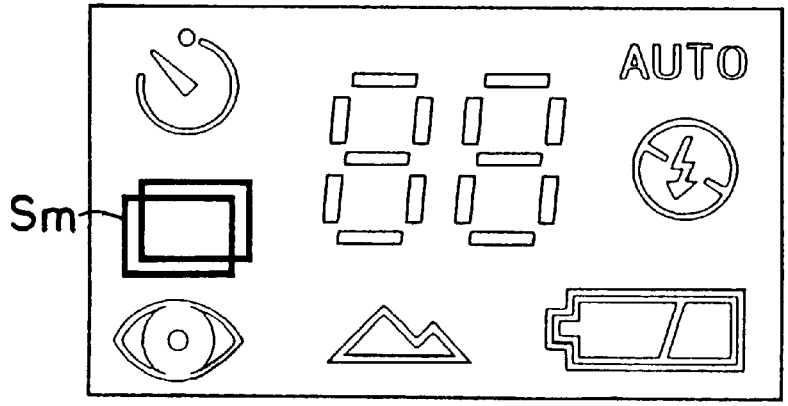
Figure 4:
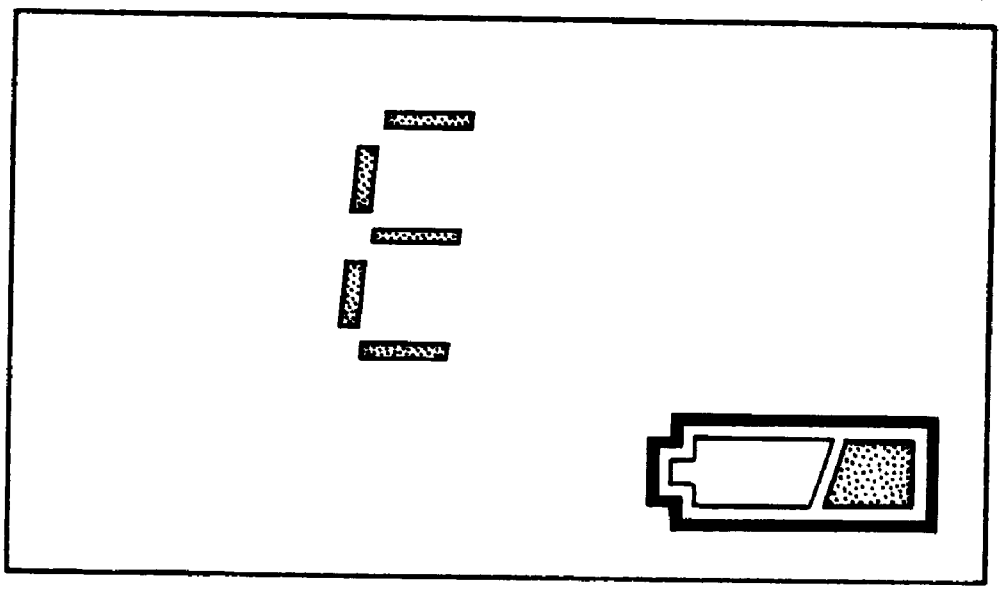
FIG. 4 is an illustrative view showing an error display pattern on a liquid crystal display panel of a conventional camera display system.

Similarly, when an error occurs in the shutter driving circuit 12 or the shutter 12a, that is when an error is determined in a shutter sequence and the shutter 12a, for example, and the shutter will not open or close, the CPU 11 outputs a command to the liquid crystal display circuit 18 to turn ON the display pattern Sm with the other display patterns flickered as shown in FIG. 3(c).

The foregoing description was made for the case when an error occurs in the zoom lens driving circuit 16 or zoom lens 16a, the strobe circuit 15 or strobe flash 15a, and the shutter driving circuit 12 or shutter 12a. Besides these cases, similar measures can be taken for errors in other mechanisms of the camera, such as, for example, the RAM 11a, the ROM 11b, the light measuring circuit 13, the distance measuring circuit 14, the lens driving circuit 16, the battery 1 or the power source circuit 2, the film feed circuit 17, the remote control or the bar code reader.

In this manner, allocations are made for a particular display pattern corresponding to an error of a particular circuit so that a relevant display pattern can be turned ON while the other remaining display patterns are flickered. By this construction, the operator can readily recognize a camera error. Further, a camera repair shop to which the camera is brought for repair can readily locate the source and nature of the error.

A second embodiment of the camera display system according to the present invention will now be described wherein one of the camera switches is operated to effect the display of errors. Arrangement may be made such that, when an error occurs, the CPU 11 controls the liquid crystal display circuit 18 to turn OFF all of the display patterns and the error is displayed for only a predetermined time period (e.g., 10 seconds) when the main switch Bsw, for example, is depressed. By this construction, an error can be displayed to the operator when required. Accordingly, there is no necessity to display the error for an unnecessarily long time, thereby reducing battery consumption. In a manner reverse to this, it is possible to immediately perform an error display operation at the time the error occurs so that all of the display patterns can be turned OFF when the main switch Bsw is depressed.

Meanwhile, a temporary error such as an inoperative zoom function may occur due to, for example, contact of the lens barrel by an operator's hand. In the first and second embodiments, an operation could not be accepted after displaying such error. In a third embodiment according to the present invention, however, arrangement is made such that when the CPU 11 detects an error and controls the display device to display the error, the CPU 11 suspends the display of the error when the main switch Bsw is depressed. At this time, the related circuits are controlled and returned to their initial states. An operable state may be established after the error has been corrected. By this structure, operation of the camera is possible even when an inoperable state is encountered due to a temporary error.

Although in the first embodiment the flickering of the display patterns was unlimited in time, it may be limited within a time period of about several minutes not to accept every operation performed after that time. Further, in the second embodiment, display of an error may be accomplished in association with a switch other than the main switch Bsw. In the third embodiment, the return to the initial state may be accomplished by operating a switch other than the main switch Bsw.

In the foregoing embodiments according to the present invention, the display patterns other than the display pattern corresponding to a camera error are flickered. However, if it is desired that the display pattern Sb corresponding to the residual capacity of the battery be lit at all times, it may be excluded from those display patterns to be flickered. Further, another one or a plurality of the display patterns may be excluded from flickering.

Although in the foregoing embodiments an error is displayed by the liquid crystal display panel 18a, it may be displayed by an LED display, an in-finder display, or a dot-matrix display. Furthermore, where an EL (electroluminescence) device is utilized as a back-light for a liquid crystal display, the EL device of the back-light may be flickered.

As described above, a particular display pattern is allocated to an error of a particular circuit section or a driving section of the camera so that only that particular display pattern is turned ON or OFF with all of the remaining display patterns being flickered. This enables an operator to readily recognize a camera error. Furthermore, when an operator brings the camera to a camera repair shop, the camera repair person can readily identify the origin of the error by the content of the display and then take appropriate measures for correcting the error.

The display of the error may be effected for only several seconds when a particular switch is depressed. In such a case, accurate detection of an error for a particular case can be readily effected while avoiding unnecessary power consumption.

What is claimed is:

1. A camera display system comprising: a plurality of circuit sections and a driving section disposed in a camera; a display section having a plurality of display patterns each corresponding to an error detected in one of the circuit sections or the driving section; and a control section for controlling the display section and the circuit sections; wherein when an error is detected in one of the circuit sections or the driving section of the camera, the control section controls the display section to display the detected error by turning ON or OFF the display pattern corresponding to the detected error while flickering the remaining display patterns.

2. A camera display system according to claim 1; wherein the control section controls the display section to display the detected error when an operator of the camera performs a preselected operation.

3. A camera display system according to claim 1; wherein the control section returns each of the circuit sections or the driving section to an initial state when an operator of the camera performs a preselected operation.

4. A camera display system comprising: circuit means for operating a camera; display means for displaying an error detected in the circuit means and including a plurality of display patterns each corresponding to an error detected in the circuit means; and control means for controlling the circuit means to operate the camera and controlling the display means to display the error detected in the circuit means by turning ON or OFF the display pattern corresponding to the detected error while flickering the remaining display patterns.

5. A camera display system according to claim 4; wherein the control means includes means for controlling the display means to display the detected error when an operator of the camera performs a preselected operation.

6. A camera display system according to claim 4; further comprising means for selectively performing an operation on the camera to initiate control of the display means by the control means to turn ON or OFF the display pattern corresponding to the detected error while flickering the remaining display patterns.

7. A camera display system according to claim 4; wherein the control means includes means for returning the circuit means to an initial state when an operator of the camera performs a preselected operation.

8. A camera display system according to claim 4; wherein the control means includes means for suspending display of the error by the display means upon performance of a preselected operation by an operator and thereafter returning the circuit means to an initial state.

* * * * *